United States Patent [19]
Koga et al.

[11] Patent Number: 5,287,439
[45] Date of Patent: Feb. 15, 1994

[54] GRAPHIC EDITING ESPECIALLY SUITABLE FOR USE IN GRAPHIC PROGRAMMING, FLOW CHARTS, ETC.

[75] Inventors: Eiji Koga, Hadano; Takashi Nakamura, Hiratsuka; Kunitaka Ozawa, Isehara; Tsuneaki Kadosawa, Ninomiya; Hitoshi Watanabe, Atsugi, all of Japan

[73] Assignee: Canon Kabushiki Kaisha, Tokyo, Japan

[21] Appl. No.: 711,317

[22] Filed: Jun. 6, 1991

[30] Foreign Application Priority Data

Jun. 11, 1990 [JP] Japan .................. 2-149814

[51] Int. Cl.$^5$ .................................. G06F 15/62
[52] U.S. Cl. .................. 395/133; 395/155; 395/161; 395/165
[58] Field of Search .................. 395/140-143, 395/155-161, 162-164, 165, 133

[56] References Cited

U.S. PATENT DOCUMENTS 4,928,247  5/1990  Doyle et al. .................. 395/164 X
5,034,899  7/1991  Schult .............................. 395/143 X Primary Examiner—Gary V. Harkcom
Assistant Examiner—Almis Jankus
Attorney, Agent, or Firm—Fitzpatrick, Cella, Harper & Scinto

[57] ABSTRACT

A figure editing apparatus for editing figure sets each comprising a set of a plurality of basic figures includes a first memory for storing, in correlated form, each figure set and the plurality of basic figures constituting the figure set, a second memory for storing, in correlated form, each figure set and an area corresponding to the figure set, a third memory for storing, in correlated form, the basic figures and areas corresponding to the basic figures, and an adding/deleting unit for designating an area corresponding to a figure set or basic figure, thereby to add a basic figure to or delete the basic figure from the first memory. The editing of figure sets, each of which comprises a set of a plurality of basic figures, and particularly the editing of a graphical program, is simplified.

12 Claims, 8 Drawing Sheets

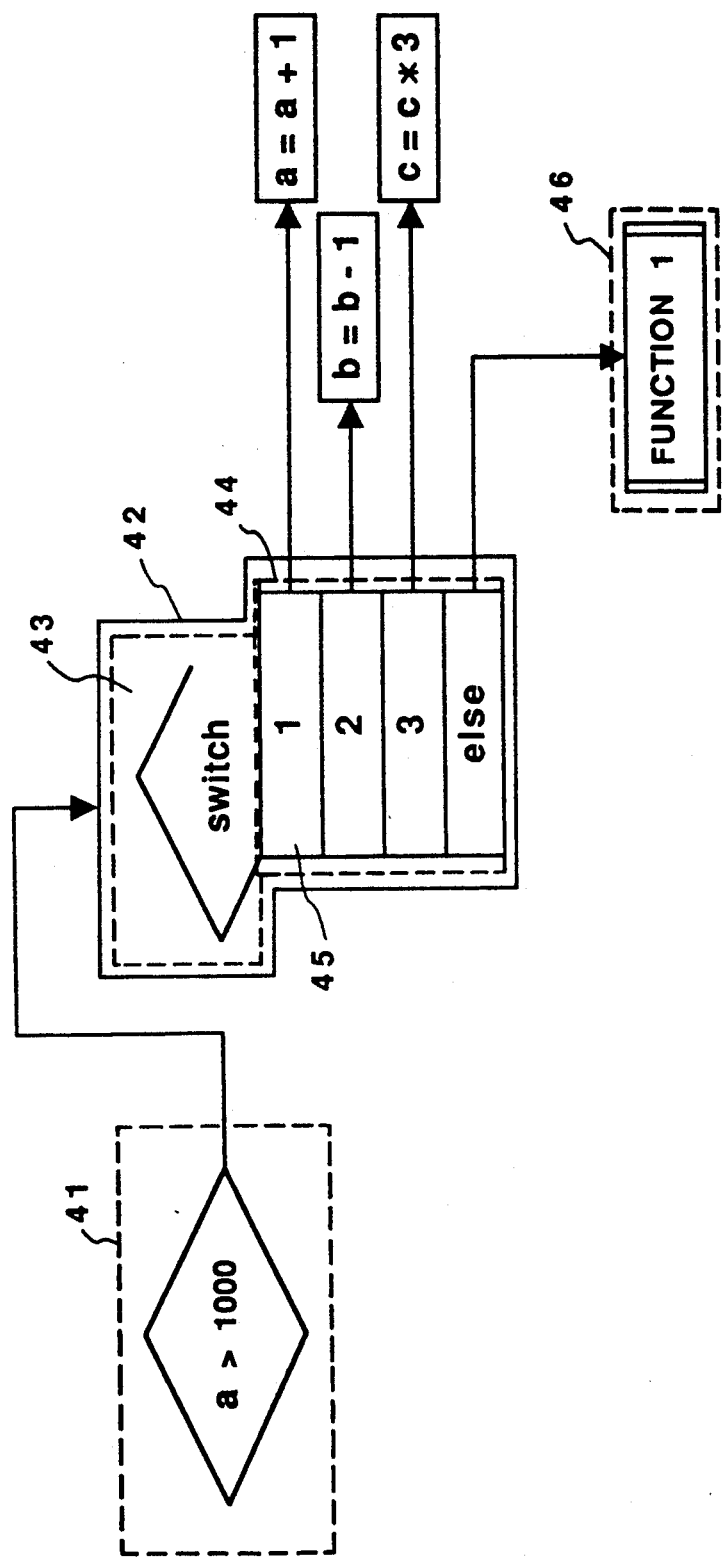
F I G. 4

GRAPHIC EDITING ESPECIALLY SUITABLE FOR USE IN GRAPHIC PROGRAMMING, FLOW CHARTS, ETC.

BACKGROUND OF THE INVENTION

1. Field of the Invention

This invention relates to a figure editing apparatus and, more particularly, to a figure editing apparatus capable of editing a graphical program by using a two-dimensional display.

2. Description of the Prior Art

A conventional figure editing apparatus is available in which figures such as rectangles and circles and character sequences are edited and displayed on a two-dimensional display unit. By using such an apparatus, it is possible to designate editing of individual basic figures. In addition, basic figures can be divided into groups and then editing can be designated for each group.

The operation involved in editing groups is especially effective in moving and copying, and the editing designation itself is simpler than an operation in which the individual basic figures are manipulated one at a time. Another advantage is that the two-dimensional relationship of the individual basic figures can be maintained.

In manipulating groups, it is necessary to designate grouping, cancel the designation, etc., before performing such figure editing operations as the moving, deleting and copying of the figures that have been grouped. In particular, if a designation cannot be made in a rectangular area, it is required that the basic figures be designated one by one.

In a case where a graphical program is to be edited by the above-described figure editing apparatus, the following problems arises:

In general, many programming languages have a structure dictated by the character of the particular language. For example, a program is composed of a collection of statements, and each statement comprises a number of structural elements. Accordingly, in a program to be edited by the editing apparatus, some of the node symbols have a plurality of variable attributes. When a plurality of variable attributes are attached to a node as a character string, it becomes difficult to understand the structure of the program at the display stage and, at the same time, the operations for deleting, moving and copying parts of the program structure entail editing of the character strings. Consequently, operation is troublesome and complicated. On the other hand, if the variable attribute portions are registered as new node symbols, the operation for editing individual attributes is simplified. However, when editing is applied to the entirety of a node having attributes attached thereto, this entails a grouping operation, which is a troublesome task.

SUMMARY OF THE INVENTION

Accordingly, an object of the present invention is to provide a figure editing apparatus adapted to simplify the editing of a figure set, which comprises a set of a plurality of basic figures, and especially the editing of a graphic program.

According to the present invention, the foregoing object is attained by providing a figure editing apparatus for editing figure sets each comprising a set of a plurality of basic figures, the apparatus comprising first memory means for storing, in correlated form, each figure set and the plurality of basic figures constituting the figure set, second memory means for storing, in correlated form, each figure set and an area corresponding to the figure set, third memory means for storing, in correlated form, the basic figures and areas corresponding to the basic figures, and adding/deleting means for designating an area corresponding to a figure set or basic figure, thereby to add a basic figure to or delete the basic figure from the first memory means.

Further, according to another aspect of the present invention, the foregoing object is attained by providing a figure editing apparatus for editing a graphical program expressed as a combination of a plurality of node symbols each representing processing; a plurality of nodes, which are structural elements of the program, having attached thereto variable attributes based upon the node symbols; directional line segments interconnecting the nodes in order to express an order in which the nodes are executed; and in a case where a plurality of directional line segments originate from the same node, attribute information for distinguishing among the directional line segments in this group of directional line segments; the apparatus comprising: input means for attaching attributes to the nodes; display means for displaying the structural elements of the graphical program; position designating means for designating positions on the display means; and memory means for storing figure information relating to the node symbols, attributes and program structure; wherein a display area occupied by a main node and a display area occupied by subnodes can each be designated; and further comprising means for referring to a group of attribute information stored in the memory means, wherein, with regard to a node generated from a node symbol having subnodes attached thereto, an editing operation for this node can be selected to be an operation for the entirety of the node inclusive of its subnodes, and an operation relating to individual ones of the subnodes, with the selection being made by designating the particular occupied display area using the position designating means.

In above arrangement, a maximum number of subnodes capable of being possessed by each node symbol can be designated as attributes of the node symbol, and/or it is further possible to designate an area to which a newly added subnode can be assigned.

In this arrangement, basic figures can be added to or deleted from a set of figures very easily, and attributes also can be added and deleted easily, all without grouping. In particular, in the editing of a graphical program, a node generated from a node symbol having subnodes can be edited, as by node movement, deletion or addition, and the editing for the overall node inclusive of subnodes can be performed easily without grouping.

Thus, in accordance with the present invention, there is provided a figure editing apparatus adapted to simplify the editing of figure sets, each of which comprises a set of a plurality of basic figures, particularly the editing of a graphical program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram showing, in greater detail, nodes to be edited, the nodes being located in a program editing area shown in FIG. 3;

DESCRIPTION OF THE PREFERRED EMBODIMENT

Figure 1:
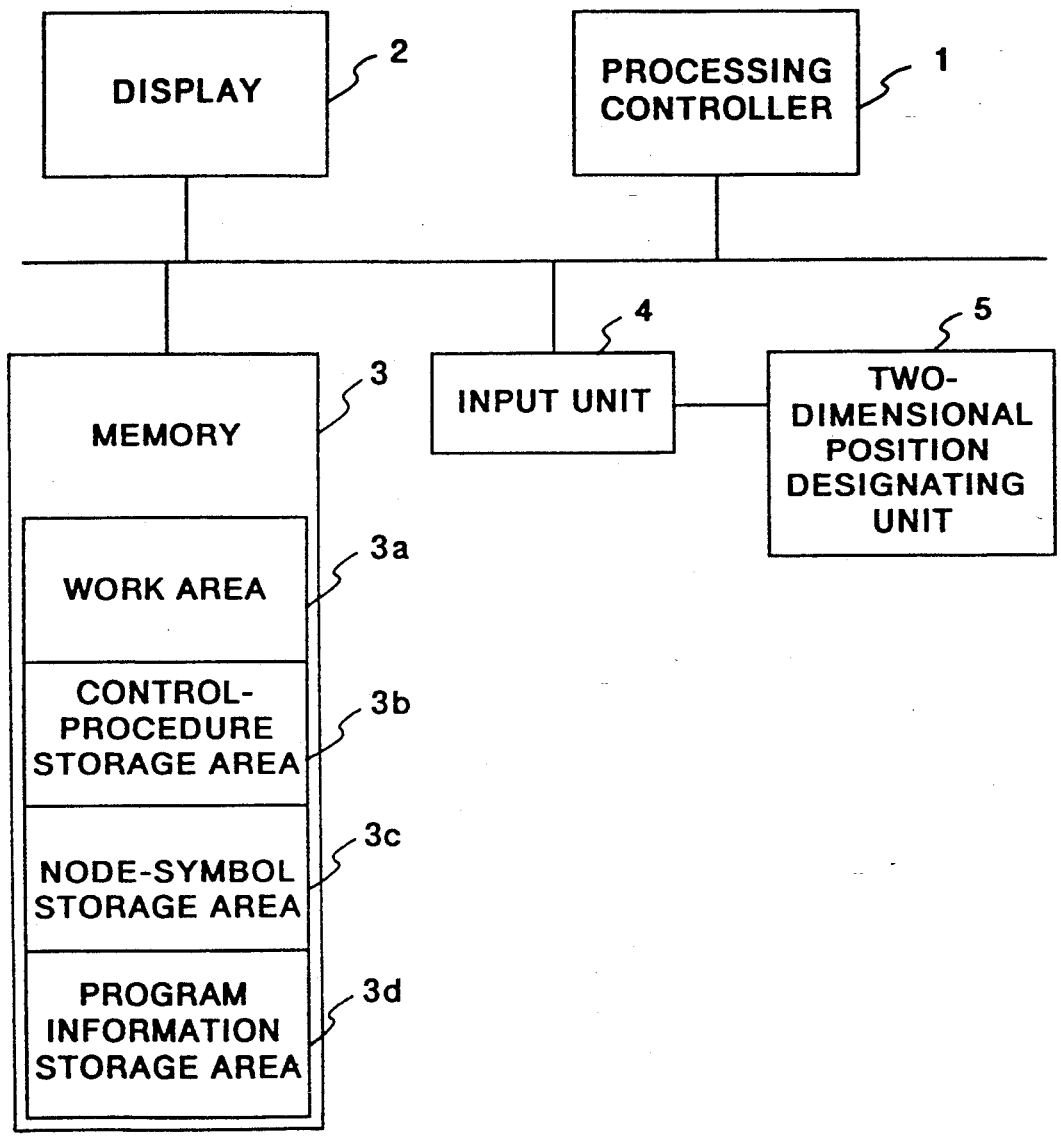
FIG. 1 is a block diagram illustrating the construction of a graphics editing apparatus according to an embodiment of the present invention.

FIG. 1 is a block diagram showing the construction of a figure editing apparatus according to an embodiment of the present invention.

As shown in FIG. 1, the apparatus includes a processing control unit 1 for controlling the figure editing operation of the apparatus, a display unit 2 for displaying edited figures and menus, a memory 3 capable of being referred to, and in which data can be stored, by the processing control unit 1, an input unit 4 such as a keyboard for entering character information or control information, and a two-dimensional position designating unit 5, such as a mouse, for designating specific positions on the display screen of the display unit 2. The memory 3 has a work area 3a, a control-procedure storage area 3b for storing the control procedure shown in FIG. 3, a node-symbol storage area 3c for storing node-symbol attribute information shown in detail in FIG. 4, and a program-information storage area 3d for storing structural information relating to a program to be edited. Input signals from the input unit 4 and two-dimensional position designating unit 5 are stored in the memory 3 through the processing controller 1.

Figure 2:
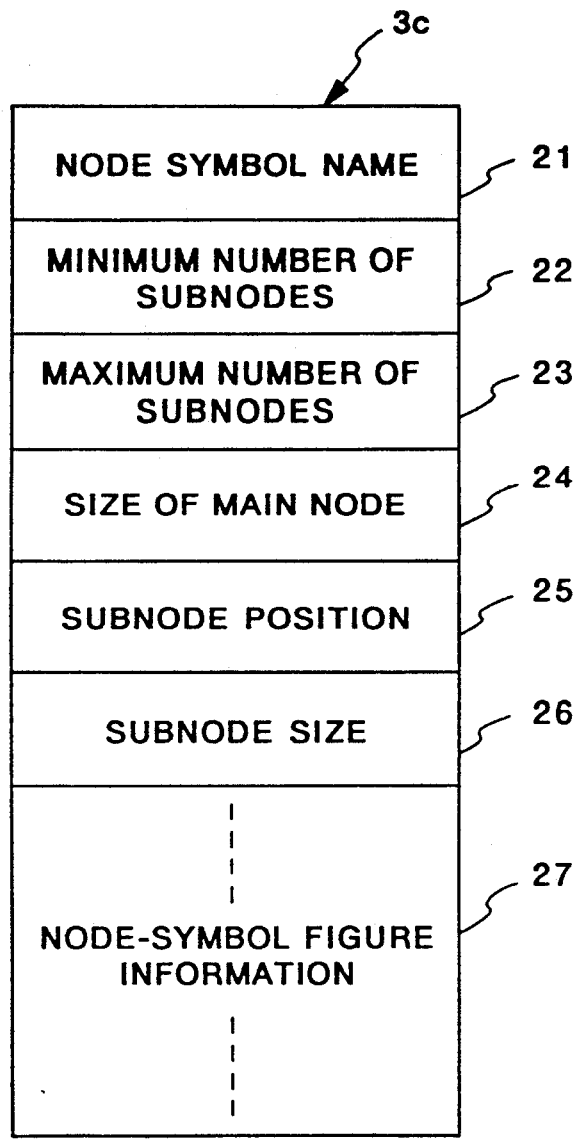
FIG. 2 is a diagram showing the structure of a node-symbol storage area within a memory.

FIG. 2 is a diagram showing the structure of the node-symbol storage area 3c.

As shown in FIG. 2, the node-symbol storage area 3c stores a node-symbol name 21, a minimum number 22 of subnodes contained in a main node, a maximum number 23 of subnodes contained in the main node, main-node size 24, subnode position 25, subnode size 26, and graphics information 27 relating to the node symbol.

Figure 3:
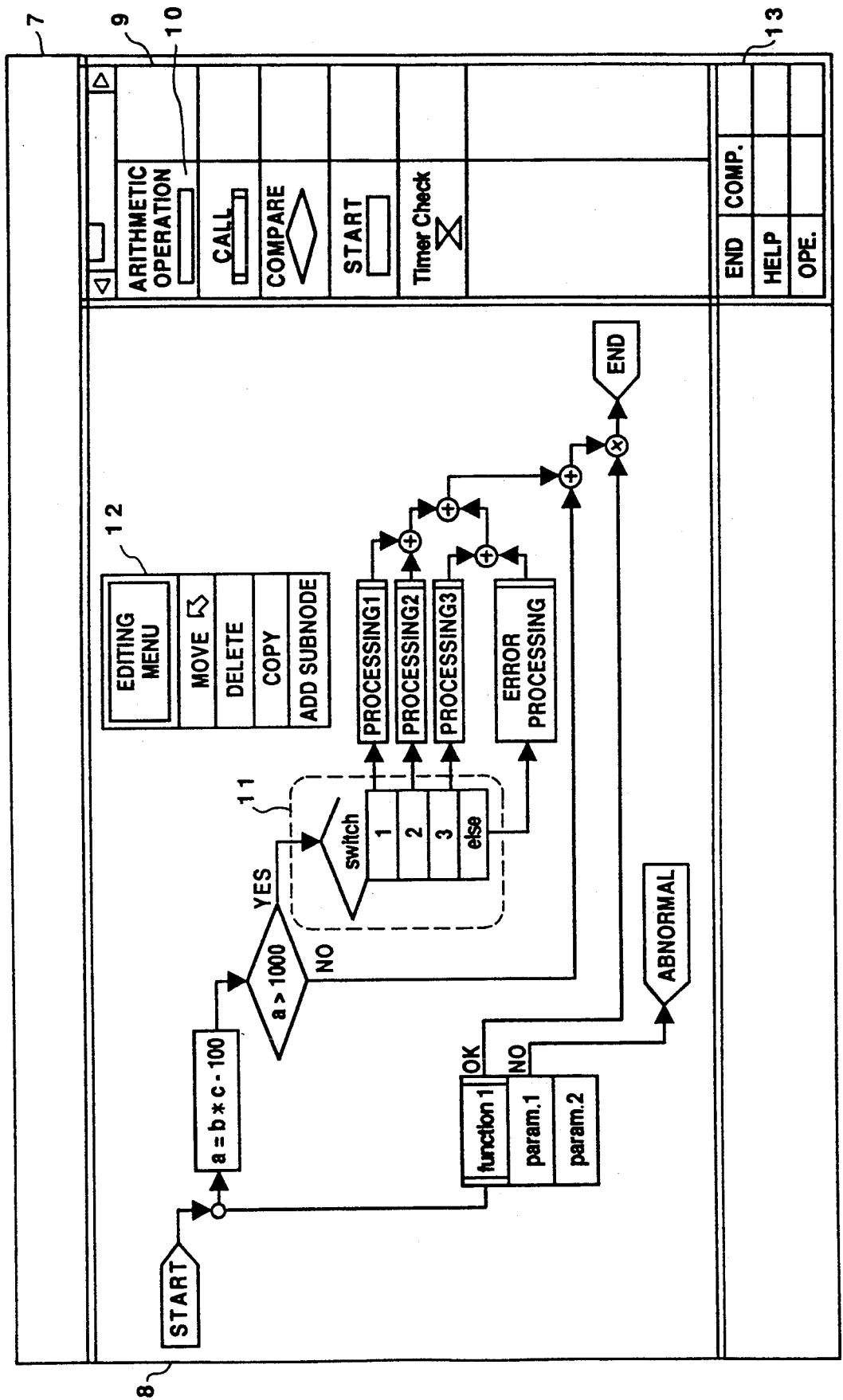
FIG. 3 is a diagram illustrating an example of a display on the screen of a display unit.

FIG. 3 is a diagram showing an example of a display on the display screen of the display unit 2 in a case where figure editing is performed by the figure editing apparatus of this embodiment.

Numeral 7 denotes an area capable of displaying a full screen. The area 7 contains an editing display area 8, which is for editing a program, and an area 9 for displaying and selecting all node symbols. The area 9 contains individual node symbols 10. Numeral 11 denotes one node generated in the program editing area 8 on the basis of a node symbol. Numeral 12 denotes an editing selection menu displayed temporarily when an editing operation is performed. Numeral 13 denotes a display selection area for designating processing of a graphical program undergoing editing.

FIG. 4 is a diagram showing the vicinity of node 11 (FIG. 3) in greater detail.

Illustrated in FIG. 4 are a node-occupied area 41 for a node not having subnodes, and node-occupied areas 42, 46 occupied by nodes capable of possessing subnodes. Also shown are a main-node-occupied area 43 contained in the area 42 and occupied by a main node, a subnode-occupied area 44 contained in the area 42 and occupied by all subnodes of the corresponding main node, and individual subnode areas 45 contained in the subnode-occupied area 44.

In FIG. 4, a simple branch node is illustrated as the node not having subnodes. Illustrated as nodes having subnodes are a multiple-branch node and a function-calling node, which is capable of assigning an argument. With regard to the multiple-branch node, the main-node portion thereof is an area in which a variable for discriminating the branch condition is written, and each subnode portion is an area in which a condition value is written. In the example of FIG. 4, $a=a+1$ is executed if the value of the variable "switch" is "1"; $b=b-1$ is executed if the value of this variable is "2"; and so on. Thus, two or more branching operations are performed depending upon the value of "switch". The function-calling node has the function name written in the main-node portion, and has zero or more arguments written in the subnode portions.

The operation of the graphics editing apparatus of this embodiment will now be described with reference to the flowcharts of FIGS. 5 through 7.

Figure 5:
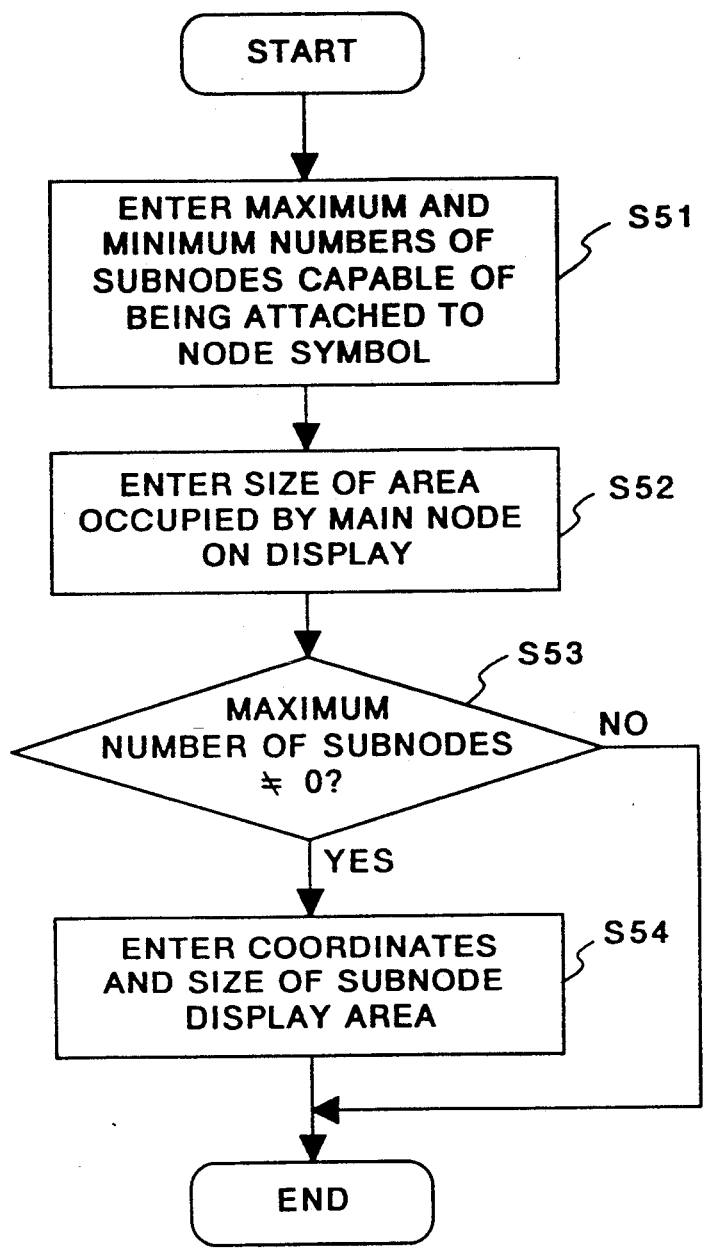
FIG. 5 is a flowchart showing a processing procedure whereby attributes are assigned to node symbols.
Figure 6:
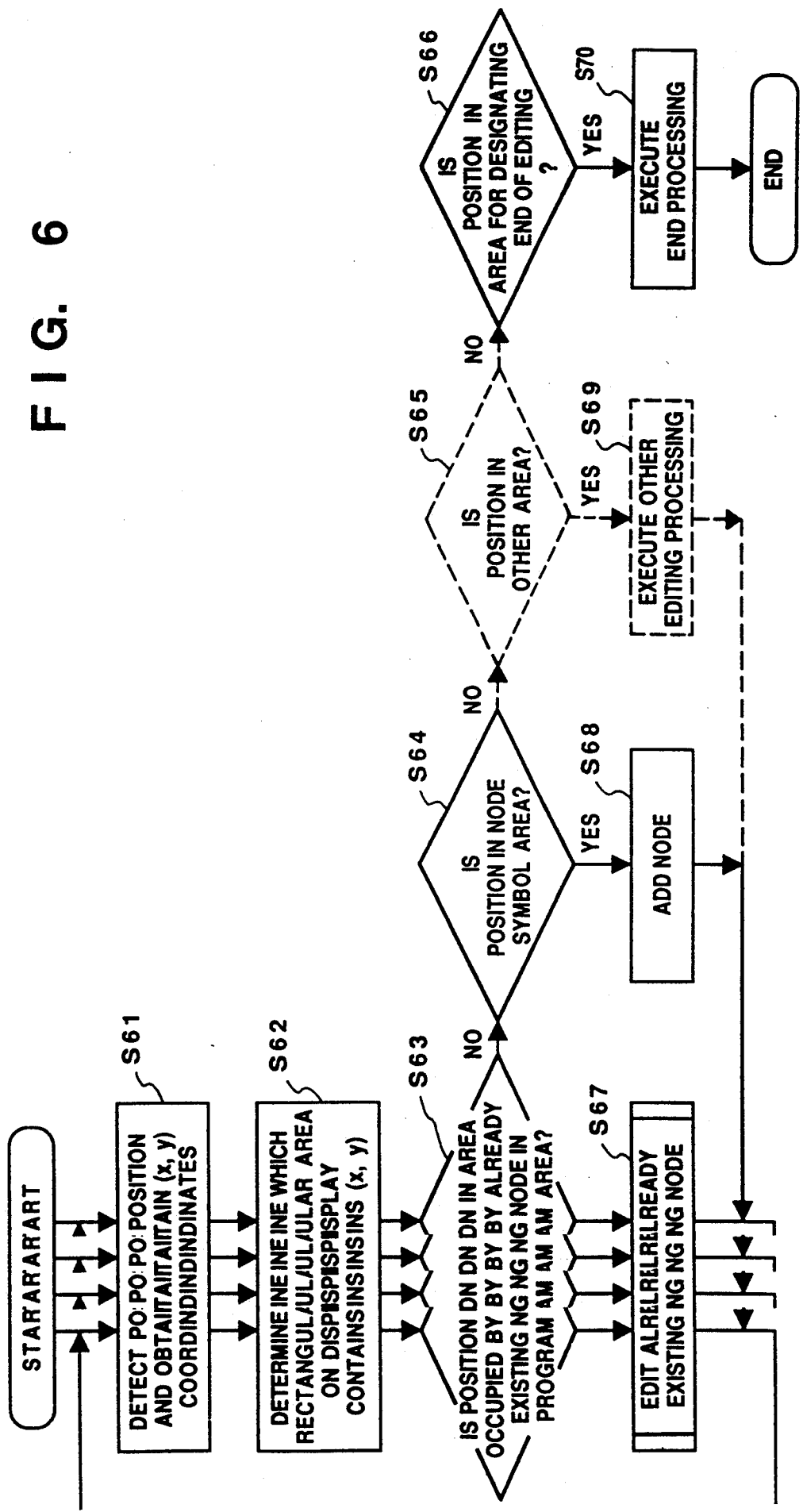
FIGS. 6 and 7 which consists of FIGS. 7A and 7B are flowcharts showing processing procedures for editing nodes.

First, prior to a graphics editing operation, the information shown in FIG. 2 is input to and preserved in the node-symbol storage area 3C of memory 3 in accordance with the procedure shown in FIG. 5. The above information is entered for each node symbol. At step S51 of the flowchart, a message appears on the display unit 2 and inquires as to how many subnodes, a node symbol is capable of possessing besides the main node. In response, the operator uses the keyboard 4 to enter the minimum and maximum numbers of subnodes. Next, the size of the area occupied by the main node on the display unit 2 is entered at step S52. It is determined at step S53 whether the maximum number of subnodes is zero or not. If that number is not zero, the program proceeds to step S54, at which the coordinates of the upper left corners and sizes of areas of the subnodes are entered. Each of these items of data is preserved in memory in the form shown in FIG. 2. When graphics editing processing starts, the screen for program editing shown in FIG. 3 is displayed and then the system waits for the operator to enter a command designating the editing operation.

In order to generate a new node in area 8 (FIG. 3), one of the node symbols in area 9 is selected by the two-dimensional position designating unit 9, and a position for this node is designated that will not overlap the other nodes in area 8. The function for generating a new node utilizes the information in the program-information storage area 3d as well as the node symbol information shown in FIG. 2. This function is implemented through the control procedure shown in the flowchart of FIG. 6. Though this procedure has no direct bearing upon the problem which the present invention attempts to solve, it will be described in brief.

First, at step S61 of the flowchart, the designated position is detected to obtain coordinates (x,y). Next, at step S62, it is determined in which rectangular area on the screen the position at coordinates (x,y) resides. If the area is found to be an area occupied by an already existing node in the graphical program area 8, the program proceeds from step S63 to step S67, at which various types of editing processing are executed. If a area in which the position is found is the node-symbol area, the program proceeds from step S64 to step S68, at which a node is added. Thus, depending upon the area in which the designated position is found, the processing steps S65→S69 are executed. In a case where the area designated is that for end of editing, the program proceeds from step S66 to step S70, at which processing is terminated.

Figure 7A:
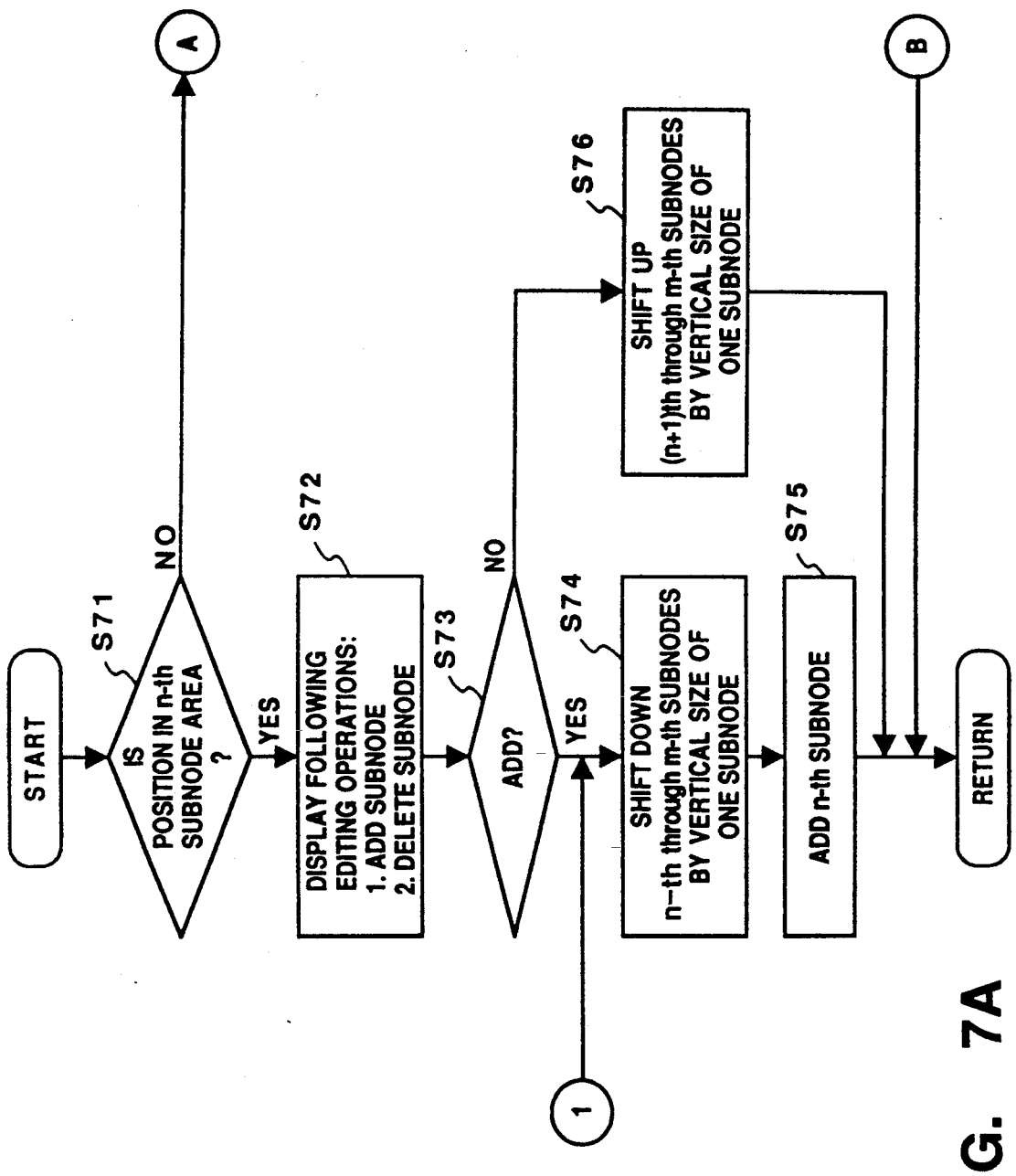
Figure 7B:
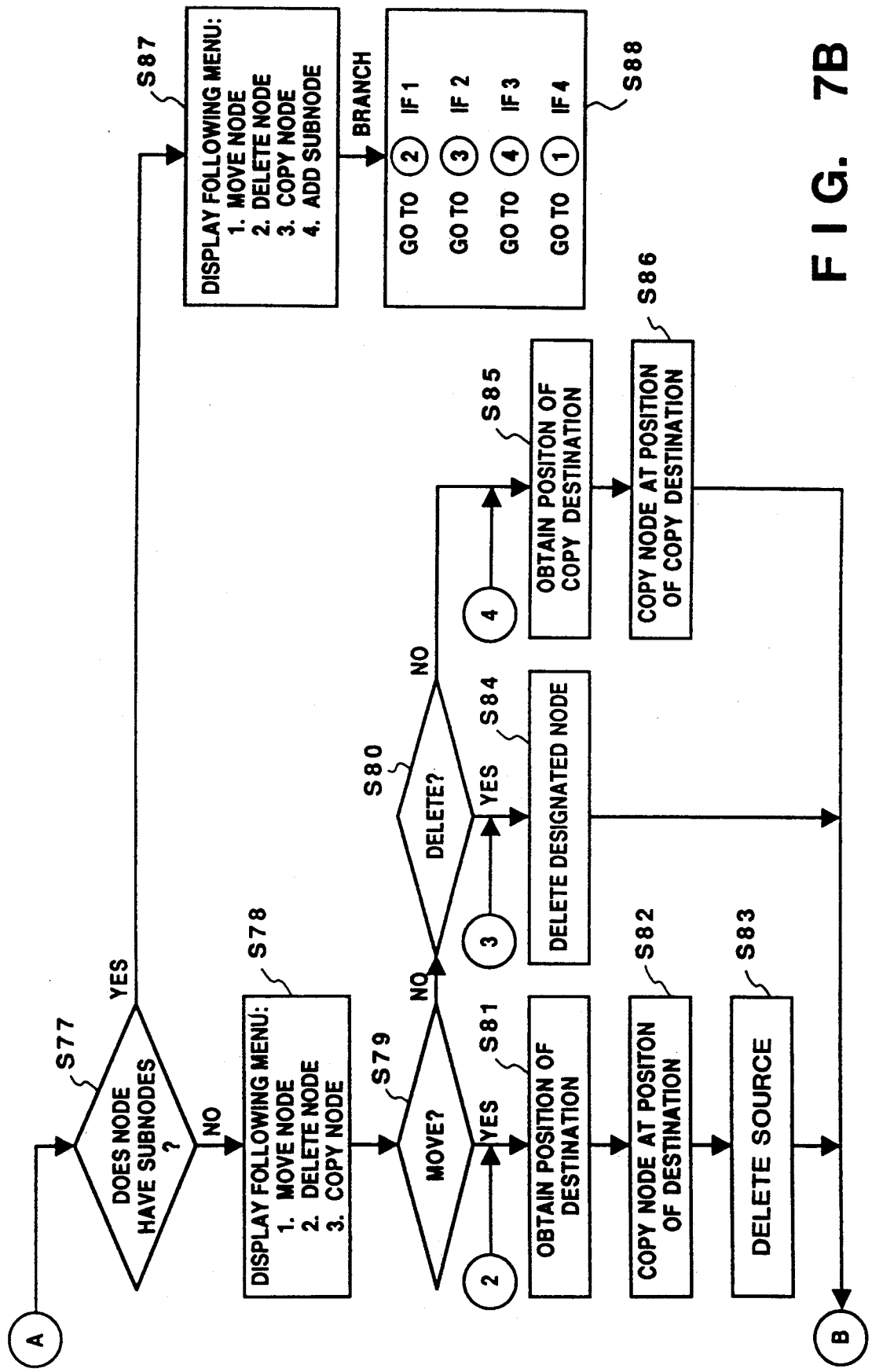

Next, the flowcharts of FIGS. 4, 7A and 7B will be referred to in order to describe a case in which such node-editing operations as move, delete and copy are applied to an already existing node present in area 8 of FIG. 3.

FIGS. 7A and 7B show a processing procedure executed when an editing operation is applied to an already existing node. Steps 71 calls for a determination as to whether an area designated for editing is a subnode area. If the area is not a subnode area, then it is determined at step S77 whether the node to be edited is one capable of having subnodes. In case of the example shown in FIG. 4, the program would branch to step S78 if area 41 were selected; to step S87 if area 43 or 46 were selected; and to step S72 if n is 1 and m is 4 when area 45 is selected.

In the processing executed at steps S72–S76, the operation menu can be reduced to the two items of subnode addition and deletion, as at step S72, since it is known from step S71 that the editing operation is to be applied to a subnode. If addition is selected, the program proceeds from step S73 to step S74, at which the first through fourth subnodes are shifted downward one space, and at step S75, a blank subnode is added as the first subnode. If subnode deletion is selected from the menu, the program proceeds from step S73 to step S76, at which the second through fourth subnodes are shifted upward one space and the portion at which the fourth subnode was located is deleted.

Similarly, since it is known from step S77 that the designated node is not a subnode, steps S78 through S86 are executed. Specifically, the operating menu is made three items at step S78, and the entire node is subjected to move, delete or copy processing. At step S87, an item for subnode addition is added to the menu to join the editing items for the entirety of the node. When this subnode-addition item is selected, the program jumps to step S74 when both n and m are 0 so that one blank subnode is added as the first subnode. When any of items 1 through 3 in the menu is selected, this means that the editing operation is to be applied to the whole node. Therefore, the editing processing of steps S81 through S83, the editing processing of step S84 or the editing processing of steps S85 and S86 is applied to the area containing the entirety of the main node and its subnodes.

In accordance with this embodiment, when a graphical program is edited in the graphics editing apparatus, the number of subnodes capable of being attached besides the main node, the size of the node area and the display position thereof are added to the attributes of a node symbol which serves as a basis for generating a node that is a structural element of the program. In a case where an area selected for editing in the program area is a subnode or main node, it is determined whether the node is one capable of having subnodes attached thereto. Thus, in addition to an editing operation performed in subnode units, it is possible for the editing of an entire node inclusive of its subnodes to be performed without an operation for grouping nodes and subnodes. This makes it easy and simple to edit a graphical program possessing a structure.

The present embodiment has been described with reference to editing of a graphical program, in which particularly outstanding results are obtained. However, the invention can be applied to figures in general and is useful for editing one unified figure, which is composed of a combination of a plurality of basic figures, in units of the individual basic figures or in a unit consisting of the figure as a whole.

As many apparently widely different embodiments of the present invention can be made without departing from the spirit and scope thereof, it is to be understood that the invention is not limited to the specific embodiments thereof except as defined in the appended claims.

What is claimed is:

1. A figure editing apparatus for editing figure sets each comprising at least one figure, the apparatus comprising:

display means for displaying figure sets;

first memory means for storing relationships between each figure set and figures contained in that figure set;

second memory means for storing areas on said display means, each area corresponding to at least one respective figure set;

third memory means for storing areas on said display means, each area corresponding to at least one respective figure;

editing means for editing a figure or a figure set displayed on the display means by referring to the first memory means;

designating means for designating a position on the display means;

judging means for referring to said second and third memory means and judging which of an area corresponding to a figure or an area corresponding to a figure set contains the position designated by said designating means;

first control means for, if said judging means judges that an area corresponding to a figure contains the designated position, controlling said editing means to initiate editing of the figure corresponding to the area which contains the designated position; and second control means for, if said judging means judges an area corresponding to a figure set contains the designated position, controlling said editing means to initiate editing of all figures included in the figure set corresponding to the area which contains the designated position.

2. A figure editing apparatus for editing a graphical program expressed by a combination of a plurality of nodes, each representing processing and each being capable of possessing subnodes, the plurality of nodes being interconnected by line segments in order of execution of processing, said apparatus comprising:

display means for displaying the nodes;

first memory means for storing information on subnodes possessed by respective ones of the nodes;

second memory means for storing areas on said display means, each area corresponding to at least one respective node;

third memory means for storing areas on said display means, each area corresponding to respective subnodes;

editing means for editing the node or subnode displayed on the display means by referring to the first memory means;

designating means for designation of a position on the display means;

judging means for referring to said second and third memory means and judging which of an area corresponding to a node or an area corresponding to a subnode contains the position designated by said designation means;

first control means for, if said judging means judges that an area corresponding to a subnode contains the designated position, controlling said editing means to initiate editing of the subnode corresponding to the area which contains the designated position; and second control means for, if said judging means judges that an area corresponding to a node contains the designated position, controlling said editing means to initiate editing of all subnodes includes in the node corresponding to the area which contains the designated position.

3. A method for editing figure sets each containing at least one figure, comprising the steps of;

storing relationships between each figure set and the figure contained therein in a first memory;

storing areas on a display, each area corresponding to respective figure sets in a second memory;

storing areas on the display, each area corresponding to respective figures in a third memory;

displaying the figure sets on the display;

designating a position on the display;

judging which of an area corresponding to a figure or an area corresponding to a figure set contains the designated position by referring to the second and the third memory;

initiating, if it is judged that an area corresponding to a figure contains the designated position, editing of the figure on the display corresponding to the area which contains the designated position; and initiating, if it is judged that an area corresponding to a figure set contains the designated position, editing of all figures included in the figure set on the display corresponding to the area which contains the designated position by referring to the first memory.

4. A method according to claim 3, wherein said editing of a figure comprises deleting the figure from the area containing the designated position.

5. A method according to claim 3, wherein said editing of a figure comprises adding a new figure to a figure set including the figure in the area containing the designated position at a position corresponding to the figure in the area containing the designated position.

6. A method according to claim 3, wherein said editing of a figure set comprises deleting the figure set from the area containing the designated position.

7. A method according to claim 3, wherein said editing of a figure set comprises adding a new figure to the figure set in the area containing the designated position at a predetermined position corresponding tot he figure set in the area containing the designated position.

8. A method for editing a graphical program expressed by a combination of a plurality of nodes each representing processing and capable of possessing subnodes, the plurality of nodes being interconnected by line segments in order of execution of processing, said method comprising the steps of:

storing information on subnodes possessed by each of the nodes in a first memory;

storing areas on a display, each area corresponding to respective nodes in a second memory;

storing areas on the display, each area corresponding to respective subnodes in a third memory;

displaying the nodes and the subnodes on the display;

designating a position on the display;

judging which of an area corresponding to a node or an area corresponding to a subnode contains the designated position by referring to the second and the third memory;

initiating, if it is judged that an area corresponding to a subnode contains the designated position, editing of the subnode on the display corresponding to the area which contains the designated position; and initiating, if it is judged that an area corresponding to a node contains the designated position, editing of all subnodes included in the node on the display corresponding to the area which contains the designated position by referring to the first memory.

9. A method according to claim 8, wherein said editing of a subnode comprises deleting the subnode from the area containing the designated position.

10. A method according to claim 8, wherein said editing of a subnode comprises adding a new subnode to the node possessing the subnode in the area containing the designated position at the position corresponding to the subnode in the area containing the designated position.

11. A method according to claim 8, wherein said editing of a node comprises deleting the node in the area containing the designated position.

12. A method according to claim 8, wherein said editing of a node comprises adding a new subnode to the node set in the area containing the designated position at a first subnode position corresponding to the node in the area containing the designated position.

* * * * *

UNITED STATES PATENT AND TRADEMARK OFFICE
CERTIFICATE OF CORRECTION

PATENT NO. : 5,287,439
DATED : February 15, 1994
INVENTOR(S) : EIJI KOGA, ET AL.

It is certified that error appears in the above-indentified patent and that said Letters Patent is hereby corrected as shown below:

ON TITLE PAGE

In [56] References Cited, under U.S. PATENT DOCUMENTS, insert: --4,831,580  5/1989  Yamada .... 364/900
4,967,372  10/1990  Feldman ... 364/518--.

In [56] References Cited, insert:
--   FOREIGN PATENT DOCUMENTS
415796  3/1991  European Pat. Off. ... G06F 3/023--.

In [56] References Cited, insert:
--   OTHER PUBLICATIONS
"Selection with a Hierarchical Group of Objects", IBM Technical Disclosure Bulletin, Vol. 29, No. 4, pp. 1739-41, 9/1986--.

COLUMN 1

Line 35, "arises:" should read --arise:--.

COLUMN 2

Line 44, "above" should read --the above--.

COLUMN 4

Line 31, "area 3C" should read --area 3c--.
Line 35, "subnodes," should read --subnodes--.
Line 53, "unit 9," should read --unit 5,--.

UNITED STATES PATENT AND TRADEMARK OFFICE
CERTIFICATE OF CORRECTION

PATENT NO. : 5,287,439
DATED : February 15, 1994
INVENTOR(S) : EIJI KOGA, ET AL.

It is certified that error appears in the above-indentified patent and that said Letters Patent is hereby corrected as shown below:

COLUMN 5

Line 2, "a" should read --the--.
Line 3, "the" (second occurrence) should read --a--.
Line 18, "Steps 71" should read --Step S71--.
Line 22, "case" should read --the case--.

COLUMN 7

Line 22, "cludes" should read --cluded--.
Line 25, "of;" should read --of:--.

COLUMN 8

Line 9, "tot he" should read --to the--.

Signed and Sealed this

Thirteenth Day of September, 1994

Attest:

BRUCE LEHMAN

*Attesting Officer*  *Commissioner of Patents and Trademarks*